US010869091B1

(12) United States Patent
Liu et al.

(10) Patent No.: US 10,869,091 B1
(45) Date of Patent: Dec. 15, 2020

(54) LATENCY DETECTION FOR STREAMING VIDEO

(71) Applicant: Amazon Technologies, Inc., Seattle, WA (US)

(72) Inventors: Zongyi Liu, Redmond, WA (US); Bruce Ferry, Seattle, WA (US); Ayush Goyal, Seattle, WA (US); Kun Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/532,949

(22) Filed: Aug. 6, 2019

(51) Int. Cl.
| | |
|---|---|
| *H04H 60/29* | (2008.01) |
| *H04N 21/466* | (2011.01) |
| *H04N 21/472* | (2011.01) |
| *H04N 21/438* | (2011.01) |
| *H04N 21/442* | (2011.01) |
| *G06N 3/04* | (2006.01) |
| *H04N 21/44* | (2011.01) |
| *G06N 3/08* | (2006.01) |

(52) U.S. Cl.
CPC ....... *H04N 21/4662* (2013.01); *G06N 3/0472* (2013.01); *H04N 21/4384* (2013.01); *H04N 21/44008* (2013.01); *H04N 21/44209* (2013.01); *H04N 21/47217* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,418,316 B1* | 8/2016 | Liu | G06K 9/3258 |
| 9,578,395 B1* | 2/2017 | Qureshi | H04N 21/2393 |
| 10,313,759 B1* | 6/2019 | Waggoner | H04N 21/845 |
| 10,356,159 B1* | 7/2019 | Waggoner | H04N 21/2387 |
| 2010/0329359 A1* | 12/2010 | Iyer | G11B 27/031 375/240.26 |
| 2014/0259038 A1* | 9/2014 | Belyaev | H04N 21/4622 725/14 |
| 2017/0228600 A1* | 8/2017 | Syed | G06K 9/325 |
| 2017/0270363 A1* | 9/2017 | Polak | G06K 9/00765 |
| 2018/0108354 A1* | 4/2018 | Negi | G10L 15/26 |
| 2018/0160200 A1* | 6/2018 | Goel | G06F 40/289 |
| 2018/0173958 A1* | 6/2018 | Hu | G06K 9/4628 |
| 2019/0188528 A1* | 6/2019 | Wen | G06K 9/4642 |
| 2019/0221001 A1* | 7/2019 | Dassa | H04N 21/4316 |
| 2019/0294729 A1* | 9/2019 | Jiang | G06K 9/00718 |

* cited by examiner

*Primary Examiner* — William J Kim
(74) *Attorney, Agent, or Firm* — Eversheds Sutherland (US) LLP

(57) ABSTRACT

Systems, methods, and computer-readable media are disclosed for systems and methods for latency detection for streaming video. Example methods may include receiving a request to determine a time to first frame for video content, determining a streaming service and a playback device associated with the request, and determining a time at which playback of the content is initiated. Example methods include capturing a playback sequence of the video content, classifying individual frames of the playback sequence, where each classification is associated with a probability value indicative of a likelihood the frame is a first frame, analyzing classifications of the individual frames, and determining, based at least in part on the analysis of the classifications of the individual frames, the time to first frame for the video content.

20 Claims, 6 Drawing Sheets

LATENCY DETECTION FOR STREAMING VIDEO

BACKGROUND

Digital content, such as movies and television shows, may be streamed using any number of playback devices and services. For example, a user may stream video content using a gaming console, a streaming device coupled to a television, a smart television, and so forth. Any number of streaming services may be used with such playback devices. Playback devices and services may have different content loading interfaces. For example, a first platform may automatically present a trailer associated with video content prior to beginning playback of the content, while a second platform may present a synopsis associated with video content prior to playback of the content. In addition, the way in which content is encoded may cause a variable delay in presentation of a first frame of the content. The amount of latency in presenting selected content may impact a user experience, and latency may vary for the same content across different streaming services and devices. Accordingly, latency detection for streaming video may be desired such that content providers can optimize their content for various streaming services and/or devices.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
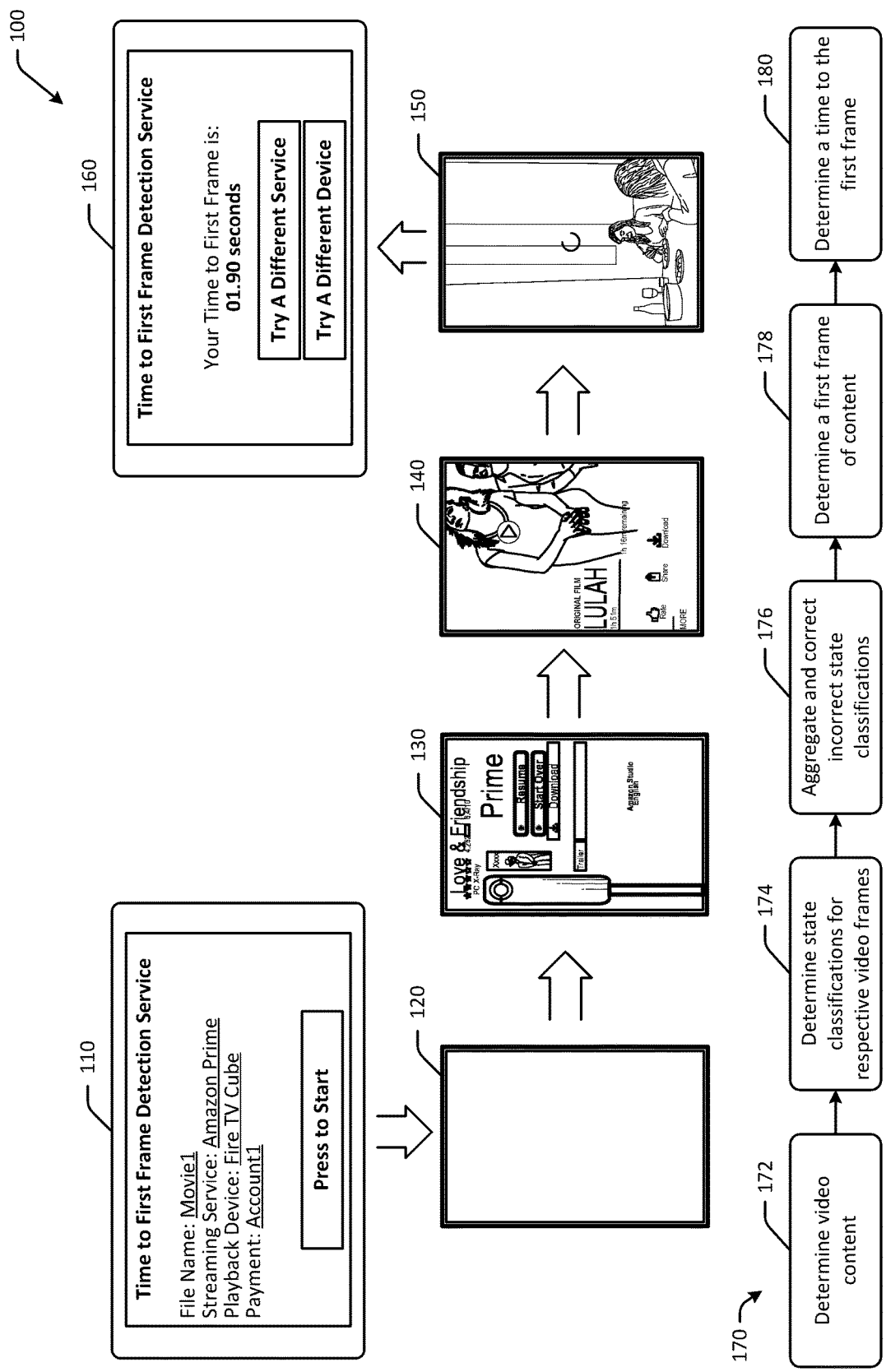
FIG. 1 is a schematic illustration of an example use case for latency detection for streaming video in accordance with one or more example embodiments of the disclosure.

Digital content may include video content, such as movies, television shows, music videos, instructional or entertaining short videos (e.g., YouTube, etc.) streaming shows (e.g., made for Prime Video, Netflix, etc.), and other video content. Users may view such video content using any number of streaming services on any number of different playback devices. For example, a user may access Prime Video using a content streaming device coupled to a television, an application on a smart television, a smartphone, a tablet, or any other playback device. Similarly, a user may access different streaming services on such playback devices.

Users may navigate to content that the user desires to view. For example, a user may navigate to a detail page that provides information, such as a synopsis or content summary, related to the content. The user may then select a playback option to initiate playback of the desired content. Different streaming services and/or playback devices may have different navigation user interfaces, content selection user interfaces, content selection sequences, and so forth. For example, a first streaming service may automatically present a trailer associated with video content prior to playback of the content, while a second platform may present a synopsis associated with video content prior to playback of the content. In addition, the same streaming service may have different content loading sequences or user interfaces for different playback devices. For example, the same streaming service may have different content loading sequences on a gaming console versus a content streaming device (e.g., internet enabled television, etc.).

Latency in presenting selected content may impact a user experience. For example, an amount of latency between when a user selects a "play" feature and a first frame of the actual video content that the user desires to view may negatively impact a user experience if the latency exceeds a certain length of time. Latency may vary depending on various factors, such as content encoding, playback device capabilities such a processor speed or amount of memory, graphics card etc., network connection speed, and so forth. A "time to first frame" is therefore a measure of the latency between when a "play" or similar option is selected at a user interface and the time at which the first frame of the desired content is presented.

Determining when a displayed frame is the actual first frame of selected video content may be difficult. For example, it may be difficult to determine, based on a single frame, whether the frame is part of the video content, or part of a trailer or poster image for the video content. As a result, determining a time to first frame without manual intervention or effort may be difficult.

In some instances, content providers may desire to learn the time to first frame for their content on different streaming services and/or playback devices, such that the content provider can optimize their content to provide a quality user experience. Time to first frame values may be used by content providers to adjust their encoding for content so that their content will load as expected for different streaming platforms (e.g., Amazon Prime, Netflix, Hulu, etc.) and for different playback devices (e.g., Fire TV, iPad, smart television, iPhone, Xbox, etc.) Content providers can modify content using various methods, such as decreasing resolution of frames or buffering frames to change the time to first frame. In some embodiments of the disclosure, content providers may submit, or otherwise identify, video content, and a time to first frame may automatically be determined for a selected playback device. For example, the content provider may select an option to determine the time to first frame for the particular content on a particular streaming service and for a particular playback device. To determine the time to first frame, a playback sequence is recorded (e.g., a video camera or other capture device may be used to record the playback sequence at the requested playback device using the requested streaming service) for the requested combinations of streaming platforms and playback devices. The recorded frames from the playback devices are conditioned, in one example, by cropping out a portion of the top and bottom (e.g. 10% cropping) to remove or reduce noise. The conditioned frames are provided to a trained neural network that classifies them into one of six states (e.g., blank screen state, app state, first text state, second text state, movie state, and movie load state). Each of these states has a predetermined probability associated with it that indicates how likely it is such a frame would be the first content frame. In an example embodiment, the probability associated with the app state is 0.1, the probability associated with the movie state is 0.95, the probability associated with the movie load state is 0.85, etc. After the frames are classified, logic is used to correct any misclassifications by identifying anomalies in strings of states. The logic analyzes how long a string is since the frames should change states relatively slowly compared with a typical frame rate of 30 frames/second. The frame states are aggregated into segments (referred to herein as "SG") or groups of states (e.g. (two segment groups A and D could be represented as AAAAAAAAAAAAAADDDDDDDDDDDDDDDDDDDD, etc.).

Because different platforms use different ways of starting the content, one embodiment of the disclosed system analyzes the segments in addition to changes in motion between frames and the intensity of the frames to estimate the probability that a frame is actually the first content frame. Motion and intensity values for frames are compared to thresholds using the value of the 95% percentile, as discussed with respect to FIG. 4, and one or more equations are used to combine all of these factors to produce a probability that a frame is actually the first content frame. Because time at which the play button was pressed is known, the time to the first detected movie frame can be determined after determining the first content frame of the movie or other video content.

Embodiments of the disclosure include systems and methods for automated latency detection for streaming video. Certain embodiments of the disclosed technology operate to automatically detect or determine a first content frame of desired video content, and may therefore automatically determine a time to first frame for the video content. Some embodiments are configured to accurately and automatically determine a time to first frame regardless of the streaming service and/or playback device used to present the content. In some embodiments, a time to first frame may be determined without human effort or manual intervention. Some embodiments may be configured to provide time to first frame values that can be used to make adjustments to content encoding, content storage, and/or other factors that impact latency. In some instances, such adjustments may be automatically implemented to adjust latency.

This disclosure relates to, among other things, devices, systems, methods, computer-readable media, techniques, and methodologies for latency detection for streaming video and presentation. Certain embodiments automatically determine a first frame of content regardless of a streaming service or platform used to present the video content. Using the first frame, some embodiments determine a time to first frame value indicative of a length of time between when a playback option is selected and when the first frame is presented. In some instances, machine learning (e.g., deep neural networks, long short term memory units and/or recurrent neural networks, etc.) is used to determine a classification of individual frames, and/or to determine a probability value that a certain frame is actually a first content frame of video content.

Referring to FIG. 1, an example use case 100 for latency detection for streaming video is depicted in accordance with one or more example embodiments of the disclosure. In FIG. 1, a user interface 110 may be presented at a device, such as a smartphone, a television, a gaming console, or another type of playback device. The user interface 110 may be used by a user, such as a content provider, to request a determination of a time to first frame for the user's content on a particular streaming service and selected playback device. In order to complete the request, the user may provide payment information. For example, the user may be charged based on a number of requests, such as a number of streaming services for which the time to first frame is desired, or a number of playback devices (or combinations of streaming services and playback devices) for which the time to first frame is desired. The user interface 110 may allow a user to select, upload, or otherwise indicate content for which a time to first frame determination is requested. The user may input, for example, a file name or location. The user interface 110 may include an option to select a streaming service and a playback device for which the time to first frame is to be determined. In the example of FIG. 1, the user may select Amazon Prime and Fire TV Cube as the streaming service and playback device, respectively. The user may also input a payment account or other payment information at the user interface 110. The payment information may be used to charge the user's account for the determination of the time to first frame. The user may select the "press to start" option at the user interface after inputting the requested information and/or making the desired selections.

After the user interface 110 is completed, a playback sequence for the content on the selected streaming service and playback device may be recorded, such as using a camera. The playback sequence may include a blank screen at a second user interface 120. The blank screen may be presented as the streaming service application is launched. The playback sequence may include an application page at a third user interface 130. The application page may be used by the user to navigate to desired content. The playback sequence may include a content detail page at a fourth user interface 140, which may provide information related to the content and/or options to present a trailer for the content or the content itself. The user may select the "play" button for presentation of the content. A computer records the time at which the play or other start command is activated. The playback sequence may include a content loading indicator at a fifth user interface 150, indicating that the content is loading. At a subsequent user interface, a first frame of the content itself may be presented. The time between the selection of the play option and the presentation of the first frame is the time to first frame.

At a sixth user interface 160, results of the time to first frame determination may be presented. For example, the time to first frame is determined to be 1.9 seconds (or any time, such as about 2.5 seconds, etc., and is presented accordingly. The sixth user interface 160 includes options to reevaluate the time to first frame on a different streaming service or a different device. Using the time to first frame data, content providers can modify the encoding or other features of their content to adjust the time to first frame, thereby improving a consumer experience with the content provider's content on various streaming services and playback devices.

To determine the time to first frame value, an example process flow 170 is presented and may be performed, for example, by one or more computer systems, such as a remote server. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At block 172, the remote server may determine video content. For example, a user may input a video file or may otherwise identify video content and select a particular streaming service and playback device for which a time to first frame value is desired to be determined. If a recording of the playback sequence for the identified content/streaming service and playback device exists, it is analyzed as described below. If a recording does not exist, the playback is started and the frames of the video are recorded for analysis.

At block 174, the remote server determines state classifications for respective video frames of the video content. For example, the remote server may process individual frames of content (which may be part of the streaming application, loading sequences, the content itself, and so forth) to determine a classification value for each frame. Classification values or state values may be determined from a set of classification values.

At block 176, the remote server may aggregate and correct incorrect state classifications. For example, the remote server may improve the accuracy of classifications by aggregating individual classification values and determining, using the aggregated set of values, whether any classification values are potentially incorrect, and if so, whether the classification values should be modified. The aggregation and correction process is described in detail at least with respect to FIG. 3. In some instances, intensity and/or motion values for frames or sets of frames may be determined.

At block 178, the remote server may determine a first frame of content. For example, the remote server may determine respective probability values for some or all frames indicating how likely a frame is the first frame of actual content. The first frame in a sequence that satisfies a probability threshold may be determined to be the first content frame. Probability values for frames may be determined based at least in part on the state classification associated with a particular frame. For example, a frame classified as a loading frame may have a reduced baseline probability value relative to a frame classified as a blank state or movie state classification.

At block 180, the remote server determines a time to the first frame. For example, the remote server determines a number of frames displayed between a when a play or start button is pressed or activated and when the first frame of the content is displayed, or a length of elapsed time between an initial frame and the first frame of the content, which may represent the time to first frame.

As a result, embodiments of the disclosure measure or otherwise determine a content loading latency for video content. Certain embodiments determine a state or classification value for individual frames or images, aggregate a sequence of frame states and correct errors of individual frame classifications, use a probability model to estimate the time to first frame using the state sequence (as well as optional intensity and/or motion values as described herein). Some embodiments may include deep neural networks configured to classify an input image or frame into a state, error correction tools to correct classification errors, and tools to combine state classifications with statistical intensity and/or motion using one or more statistical models to estimate the time to first frame.

In some embodiments, users may request determination of a time to first frame value by sending a request to one or more remote servers. The one or more remote servers may receive the request to determine a time to first frame from a user device, and may cause the determined time to first frame to be presented at the user device.

In an example, one or more remote servers may determine a first video frame, a second video frame, and a third video frame, where the first video frame, second video frame, and third video frame are consecutive frames. The remote server may determine, using a neural network, a first classification for the first video frame from a set of predetermined classifications, a second classification for the second video frame from the set of predetermined classifications, and a third classification for the third video frame from the set of predetermined classifications. The remote server may determine that the second classification is different than both the first classification and the third classification, and may therefore replace the second classification with the first classification. The remote server may determine a probability value that the third frame represents the first content frame. The remote server may determine that the probability value satisfies a threshold, and may determine an elapsed time between initiation of video content and the third frame. The remote server may cause the elapsed time to be presented at a user interface.

Example embodiments of the disclosure provide a number of technical features or technical effects. For example, in accordance with example embodiments of the disclosure, certain embodiments of the disclosure may automatically analyze video content, determine initial classification values for frames, determine corrected classification values for frames, determine first frames of content, and determine time to first frame values. As a result of improved functionality, time to first frame values may be determined automatically, regardless of which streaming service or playback device is used, and may replace manual efforts to determine time to first frame measurements. Embodiments of the disclosure may improve computing efficiency and reduce bandwidth consumption by generating notifications indicative of time to first frame for content, which can be used to modify encoding or other features of content to improve efficiency and/or reduce bandwidth consumption. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
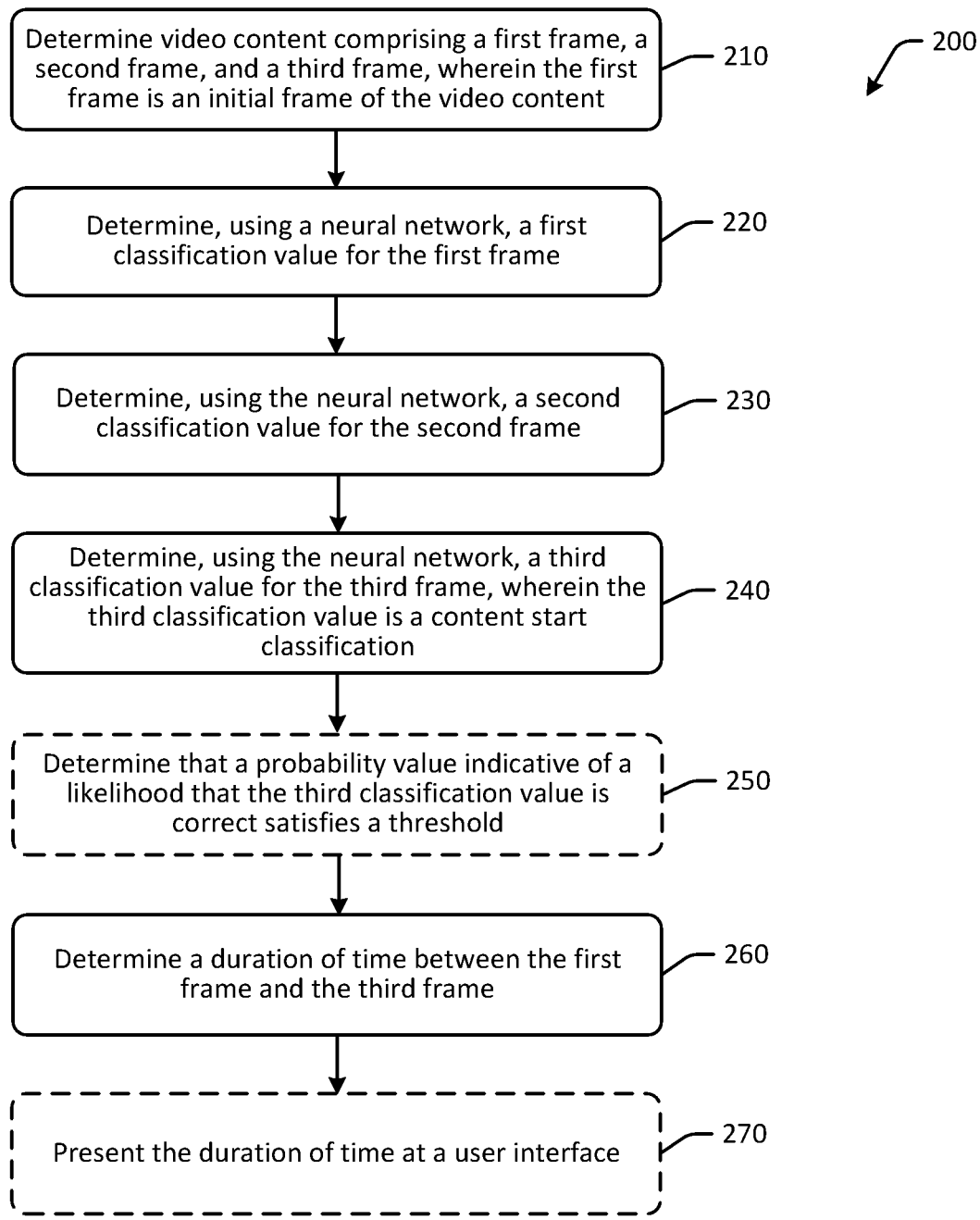
FIG. 2 is a schematic illustration of an example process flow for latency detection for streaming video in accordance with one or more example embodiments of the disclosure.

FIG. 2 depicts an example process flow 200 for latency detection for streaming video in accordance with one or more example embodiments of the disclosure. While example embodiments of the disclosure may be described in the context of movies or other video content, it should be appreciated that the disclosure is more broadly applicable to any type of digital content, and may be applicable to any type of playback device and/or streaming service. Some or all of the blocks of the process flows in this disclosure may be performed in a distributed manner across any number of devices. Some of the operations of the process flow 200 may be optional or may be performed in a different order than is described.

At block 210 of the process flow 200, computer-executable instructions stored on a memory of a device, such as a remote server, may be executed to determine or identify video content comprising a number of sequential frames one of which is an initial frame of the video content. For example, one or more state detection engines executed at a user device may determine video content. In some instances, the starting process of the video content playing on a selected streaming service and playback device may be recorded and analyzed frame-by-frame. The video content may include a plurality of individual video frames, such as a first frame, a second frame, a third frame, and so forth. The first frame may be an initial frame of the video content. For example, the first frame may be a first frame in a sequential order of frames of the video content. The video content may include more frames than those associated with particular content, such as content that a user desires to view. For example, the video content may include user interfaces associated with a streaming service that the user may interact with to locate desired content to view. The video content may include detail user interface frames that describe content, frames with synopses of video content, frames associated with trailers, frames with selection menus, and so forth that may be presented on various frames before commencing playback of the video content. The video content may be in any suitable file format and may be determined using any suitable streaming service and/or playback device. In some instances, the video content may be determined using a camera (e.g., a camera that captures presentation of the video content at a display, etc.), or may be determined by receiving or otherwise determining a file associated with the video content.

At block 220 of the process flow 200, computer-executable instructions stored on a memory of a device, such as a remote server or a user device, may be executed to determine, using a neural network, a first classification value for the first frame. For example, one or more state detection engines at a user device may determine, using a neural network, a first classification value for the first frame. The first classification value may be indicative of a type of frame that the first frame is. In some embodiments, classification values may be selected from a predetermined set of classification values. For example, the first classification value may be determined from a set of classification values or states that includes: a blank screen state, an application state, a first text state, a second text state, a movie state (or content start state), and a movie load state. The respective states may be individual classification values. For example, the first classification value may be determined to be a blank screen state. Any number of classification values or states may be included in the set of classification values.

The classification values or states may correspond to loading behaviors of different streaming services and/or platforms. For example, the blank screen state or classification value may correspond to a frame or image that does not have anything in the frame other than a background object, ambient light, or the like. The application state or classification value may correspond to a frame or an image of a streaming application or service logo/home screen or user interface (e.g., Prime Video, Netflix, Hulu, etc.). The first text state or classification value may correspond to a frame or an image with text rendered with a blank background, such as a credits page at the end of a movie. The second text state or classification value may correspond to a frame or an image with (optionally larger font) text rendered with a non-blank background, such as a trailer page with a content title, a detail or synopsis page, and so forth. The movie state or classification value (or content start state or classification value) may correspond to a frame or an image of the actual video content, such as a frame of a movie or television show. The movie state or classification value may or may not include frames that are classified as other states. For example, certain content may include frames with text such as "5 years ago," and so forth (that may be part of the movie but are classified as text states, etc.), but those frames may be classified as the first text state or the second text state as appropriate. The movie load state or classification value may correspond to a frame or an image with a rotating spinner or "loading" text with a blank background, or any other suitable indicator that content is being loaded for presentation.

To determine the first classification value, the state detection engine may implement one or more neural networks (e.g., deep neural network, etc.) or models trained to determine which of the classification values is most likely to be associated with the first frame (e.g., which classification value has the highest probability of association with the first frame, etc.). In some embodiments, the frame and corresponding data (e.g., pixel values, etc.) may be input at the neural network, and the output may be a classification value with the highest probability of being an accurate classification of the first frame. The neural network may be used to process the frame and/or corresponding data to determine a classification of the frame.

Before determining the first classification value, the frame may optionally be preprocessed. For example, the first frame may be preprocessed prior to determining the first classification value for the first frame. Preprocessing may include enhancing the frame, applying one or more masks or filters to reduce noise, cropping the frame, and/or other image processing techniques. In some embodiments, frames may be cropped to capture a region of interest that may subsequently be used to determine classification. Cropping may be used to remove elements such as "pause" buttons or options, playback bars, and/or other features that may be included in the frame but may not be part of the content itself. In such instances, the first classification value for the first frame may be determined using the region of interest of the first frame.

At block 230 of the process flow 200, computer-executable instructions stored on a memory of a device, such as a remote server, may be executed to determine, using the neural network, a second classification value for the second frame. For example, one or more state detection engines at a user device may determine, using the neural network, a second classification value for the second frame. The second classification value may be indicative of a type of frame that the second frame is. In some embodiments, classification values may be selected from a predetermined set of classification values. For example, the second classification value may be determined from the set of classification values. To determine the second classification value, the state detection engine may implement one or more neural networks (e.g., deep neural network, etc.) or models trained to determine which of the classification values is most likely to be associated with the second frame (e.g., which classification value has the highest probability of association with the second frame, etc.). In some embodiments, before determining the second classification value, the frame may optionally be preprocessed. For example, the second frame may be preprocessed prior to determining the second classification value for the second frame. Preprocessing may include enhancing the frame, applying one or more masks or filters to reduce noise, cropping the frame, and/or other image processing techniques.

At block 240 of the process flow 200, computer-executable instructions stored on a memory of a device, such as a remote server, may be executed to determine, using the neural network, a third classification value for the third frame, where the third classification value is a movie state or content start classification. For example, one or more state detection engines at a user device may determine, using the neural network, a third classification value for the third frame, where the third classification value is a content start classification. The third classification value may be indicative of a type of frame that the third frame is, which may be an initial frame of the video content or a "first frame" of the video content in some embodiments. In other embodiments, any frame of the actual video content may be classified as the movie state classification value. In some embodiments, classification values may be selected from a predetermined set of classification values. For example, the third classification value may be determined from the set of classification values. To determine the third classification value, the state detection engine may implement one or more neural networks (e.g., deep neural network, etc.) or models trained to determine which of the classification values is most likely to be associated with the third frame (e.g., which classification value has the highest probability of association with the third frame, etc.). In some embodiments, before determining the third classification value, the frame may optionally be preprocessed. For example, the third frame may be preprocessed prior to determining the second classification value for the third frame. Preprocessing may include enhancing the frame, applying one or more masks or filters to reduce noise, cropping the frame, and/or other image processing techniques.

At optional block 250 of the process flow 200, computer-executable instructions stored on a memory of a device, such as a remote server, may be executed to determine a probability value indicative of a likelihood that the third classification value is correct satisfies a threshold. For example, one or more first frame determination or detection engines at a remote server may determine a probability value indicative of a likelihood that the third classification value is a correct classification for the third frame. The probability may reflect the accuracy of the classification. In this example, the probability may indicate a likelihood that the third frame is the "first frame" of the desired video content, or the starting point of the actual video content, and not a frame associated with the loading of the content or the streaming service user interface. The probability value may be determined using the same or a different neural network. The probability value may be compared to a threshold value. If the probability value meets or exceeds, or otherwise satisfies, the threshold, the third classification value may be determined to be accurate. In another embodiment, classification values may be corrected by logic comparing a length of runs as described below.

At block 260 of the process flow 200, computer-executable instructions stored on a memory of a device, such as a remote server, may be executed to determine a duration of time between the first frame and the third frame. For example, one or more first frame determination engines at a remote server may determine a duration of time between the first frame shown when the play button is pressed and the third frame shown when the video content begin to play. A time to first frame may be the time between when "play" is pressed and the first movie frame is presented. To determine the duration of time, the first frame determination engine may determine a starting timestamp associated with the first frame, and an ending timestamp associated with the third frame, and may determine a difference between the starting and ending timestamps. The duration of time may be the "time to first frame" value for the content, and may be associated with a particular streaming service and/or playback device. For example, the same content may have a different time to first frame value on different streaming services and/or on different playback devices.

At block 270 of the process flow 200 (which is optional in the process flow 200), computer-executable instructions stored on a memory of a device, such as a remote server, may be executed to present the duration of time at a user interface. For example, one or more communication modules at a remote server may cause the duration of time to be presented at a user interface. A user may request a time to first frame value for certain content on a certain playback device and/or on a certain streaming service, and the remote server may determine the corresponding time to first frame value(s). The time to first frame may be presented at the user interface or may otherwise be communicated electronically to the user via display of the duration of time.

Figure 3:
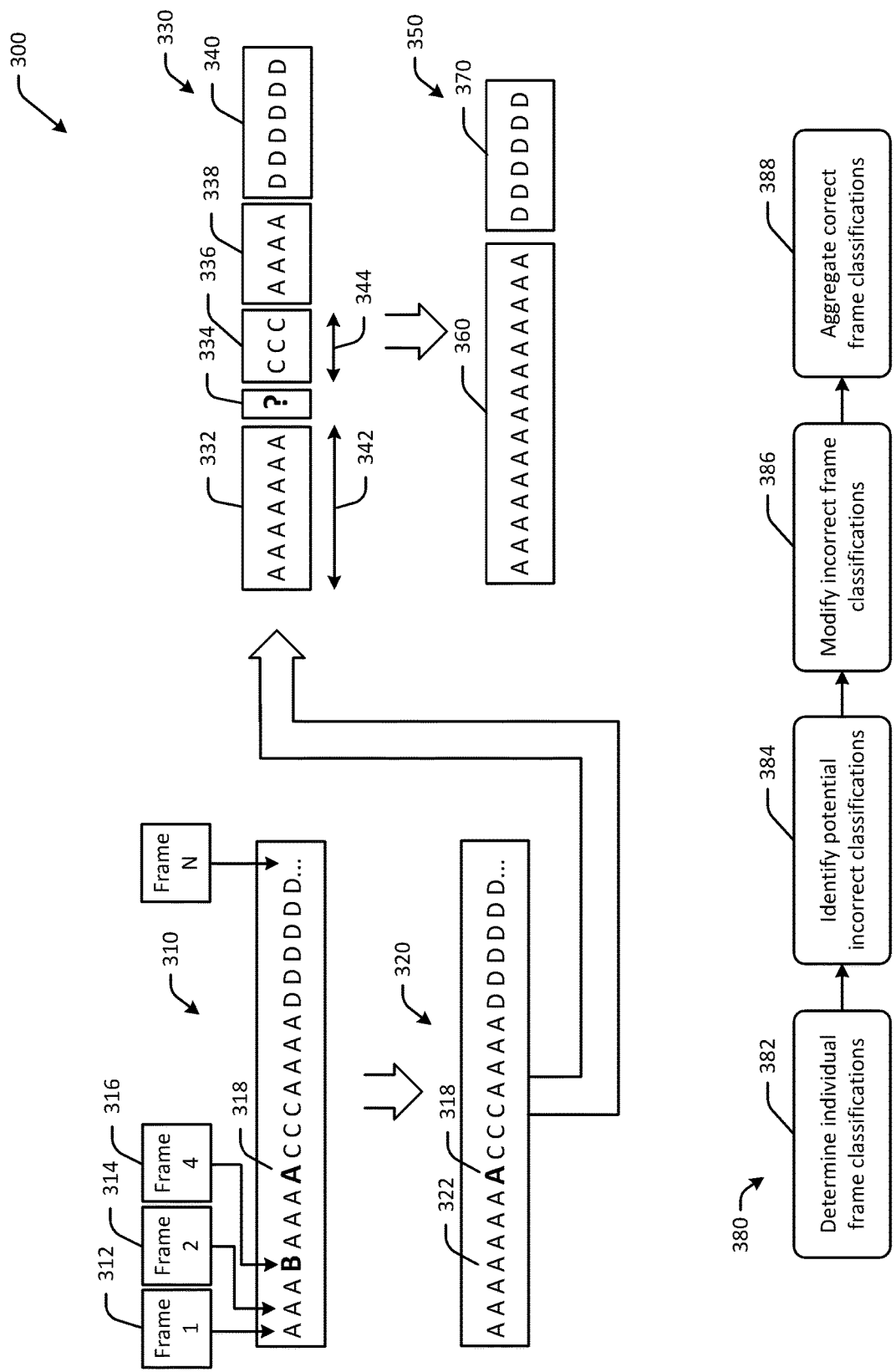
FIG. 3 is a schematic illustration of an example use case for frame classification and aggregation in accordance with one or more example embodiments of the disclosure.

FIG. 3 is a schematic illustration of an example use case 300 for frame classification and aggregation in accordance with one or more example embodiments of the disclosure. Other embodiments may include different components.

In FIG. 3, a set of frames may be analyzed and classified into one or more classification values or states. For example, a state detection engine may process frames and determine associated states or classification values for the frames. The frame classification process may be iterative in some embodiments, where initial classifications that are incorrect may be identified and corrected prior to being finalized.

For example, at a first instance 310, a set of frames may be classified into different classifications. A first frame 312 may be classified as an "A" classification value, a second frame 314 may be classified as the "A" classification value, a fourth frame 316 may be classified as a "B" classification value, an eighth frame may be classified as the "A" classification value, and so forth. The initial classifications may be determined based on the frame itself. The initial classifications may be aggregated into a sequence of classification values, as illustrated at the first instance 310.

A subsequent analysis of the aggregated classification values may result in one or more of the classification values being modified. For example, at a second instance 320, the fourth frame 316 may be modified from the "B" classification to the "A" classification 322. The state detection engine may determine that the classification of the fourth frame 316 is incorrect based at least in part on classification values of one or both adjacent frame classification values. For example, both the third frame and the fifth frame have classification values of "A," which may indicate that the "B" classification of the fourth frame is incorrect. In some embodiments, more than one adjacent classification value (e.g., multiple preceding and/or multiple subsequent frames, etc.) may be used to detect an incorrect classification and determine what a classification value should be changed to.

For example, the state detection engine may determine, using the aggregated set of classification values, that the fourth classification value is different than the fifth classification value, and may determine that the fifth classification value is different than the third classification value. The state detection engine may determine that the fourth classification value is to be replaced with the third classification value, and may accordingly replace the classification value.

In some embodiments, after a first iteration of state or classification correction, sets of frames having the same classification values may be separated into groups, as illustrated at a third instance 330. For example, a first group of frames 332 may be a set of consecutive frames having the same "A" classification. A second group of frame(s) 334 may have an unknown classification. For example, because the frame immediately preceding the frame and immediately following the frame have different classifications (and are different from each other), the classification of the frame(s) in the second group 334 may be unknown. For example, the frame(s) in the second group 334 may be part of the first group 332, or a third group 336 of frames having the same "C" classification. A fourth group 338 of frames having the same "A" classification and a fifth group 340 of frames having the same "D" classification may be determined.

In another example, the state detection engine may determine that a first set of sequential frames having the first classification value has a length that satisfies a first threshold, and may determine that a second set of sequential frames having the second classification value has a length that is less than or equal to a second threshold. Such determinations may trigger a potential merging operation.

In some embodiments, a length of time associated with the frames in a group, or a number of frames in the group, may be determined. The length of time and/or number of frames may be used to determine whether the group should be merged with a preceding or subsequent group. For example, the first group 332 may have a length of time 342 of 30 seconds, and the third group 334 may have a length of time 344 of 4 seconds. The respective lengths of time may be used to determine whether to trigger a merging operation. For example, merging operations may be performed using time thresholds. If a first group has a length of time equal to or greater than a first time threshold, such as 30 seconds, and a second group following the first group (consecutive or non-consecutive) has a length of time equal to or less than a second time threshold, such as 5 seconds, the second group may be automatically merged into the first group. Merging may include automatically modifying classification values for the second group of frames to match the classification values of the first group.

For example, in FIG. 3, at a fourth instance 350, the second group 334 and the third group 336 may be merged with the first group 332 (as well as the fourth group 338, which already had the "A" classification value), and may be modified such that the entire combined group 360 of frames has the same "A" classification value. The unknown value of the second group 334 may be modified based at least in part on the determination to modify the adjacent classification value in the third group 336 to the "A" classification value.

The fifth group 340 at the third instance 330 may become a second group 370 in the merged set of classification values.

The merging and state correction processes of FIG. 3 may improve accuracy of classification values and result in increased accuracy in detection of time to first frame values by improving detection of first frames.

Although discussed with respect to FIG. 3 as separate processes of individual state correction for frames at the second instance 320 and merging operations at the fourth instance 350, some embodiments may include a different order of operations and/or may include some but not all of the processes.

An example process flow 380 for state correction is depicted in FIG. 3. At block 382, individual frame classifications may be determined by, for example, a state detection engine. At block 384, potential incorrect classifications may be determined by the state detection engine. For example, classification values that do not match neighboring classification values may be flagged as potentially being incorrect, time thresholds may be used to determine potentially incorrect classification values, and so forth. At block 386, incorrect frame classifications may be modified. For example, merging operations or individual frame classification value adjustments may be used to modify or otherwise correct incorrect frame classifications. At block 388, correct frame classifications may be aggregated. For example, as illustrated at the fourth instance, the complete set of frame classifications may be aggregated and used to determine a first frame, and subsequently, a time to first frame.

Figure 4:
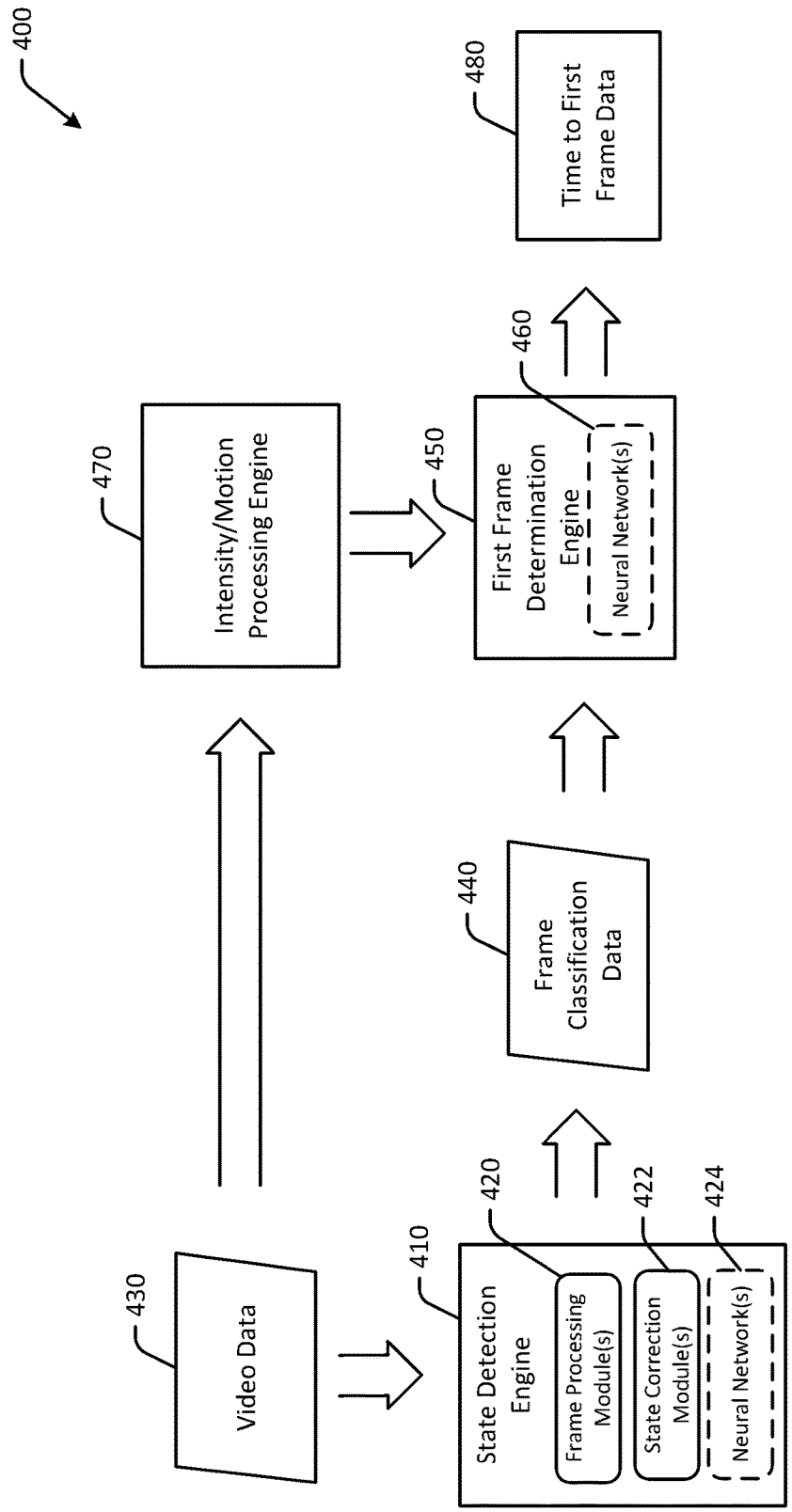
FIG. 4 is a hybrid schematic illustration of an example process and data flow in accordance with one or more example embodiments of the disclosure.

FIG. 4 schematically illustrates an example data flow 400 with inputs and outputs for latency detection for streaming video in accordance with one or more example embodiments of the disclosure. Different embodiments may include different, additional, or fewer inputs or outputs than those illustrated in the examples of FIG. 4.

In FIG. 4, an example data flow 400 is schematically depicted. A state detection engine 410 may be configured to detect or determine a state or classification value for individual frames of video content. The state detection engine 410 may include one or more frame processing modules 420, one or more state correction modules 422, and one or more optional neural networks 424. The frame processing module 420 may be configured to optionally preprocess frames before analyzing the frame using the neural network 424. For example, the frame processing module 420 may enhance the frame, apply one or more masks or filters, crop the frame for a region of interest, and/or otherwise process the frame. The state correction module 422 may be configured to identify incorrect or potentially incorrect classification values that have been assigned to or associated with respective frames. For example, a frame of a trailer for a movie may be incorrectly classified as a movie state frame. The state correction module 422 may be configured to identify incorrect classifications by analyzing adjacent frame classifications to determine whether a specific classification value is incorrect, as described with respect to FIG. 4. The neural network 424 may be a deep neural network and may be configured to receive a frame as an input and output a most likely classification value for the input frame. Additional or fewer, or different, modules may be included.

The state detection engine 410 may receive one or more inputs for content for which frame classification data 440 is to be generated. For example, the state detection engine 410 may receive video data 430 as an input. The video data 430 includes frames of video that are to be classified by the state detection engine 410. In some embodiments, the video data 430 may be extracted from a content file.

The state detection engine 410 processes the respective frames of the video data 430 to determine classification values for individual frames. For example, the state detection engine 430 may optionally preprocess the frames using the frame processing module 420, and may determine a state classification for the frame using the neural network 424. After some or all of the frames in the video data 430 are processed, the state detection engine 410 may identify and/or correct incorrect classifications using the state correction module 422. The state detection engine 410 may output the frame classification data 440, which may be a set of data indicating classification values associated with respective frames of the video data 430. The frame classification data 440 may include a sequential ordering of frames and the respective classification values.

The frame classification data 440 may be input at a first frame determination engine 450. The first frame determination engine 450 may be configured to determine which frame or frames correspond to a starting point, or near a starting point, of actual video content, or the "first frame" of the video content. The first frame of the video content may be an approximation of the starting point of the actual video content, as transitions and other effects may cause an interlacing effect among individual frames, such that more than one frame can constitute a "first frame" of the video content. To determine which frame corresponds to the first frame of the actual video content, the first frame determination engine 450 may optionally use one or more neural networks 460. The neural network 460 may be the same or different than the neural network 424. In some embodiments, the first frame determination engine 450 may analyze the frame classification data 440 to determine which frame is the first frame in a sequence of frames associated with a certain classification value, such as a movie state or content start classification value.

In some embodiments, in addition to the frame classification data 440, the first frame determination engine 450 uses intensity and/or motion data between sequential frames to determine or otherwise identify a first frame of video content. Intensity data for a frame of content may be indicative of an overall intensity or brightness of a frame, and may be determined relative to one or more preceding frames. For example, as content starts playback, frames may gradually progress from a loading state to a brighter frame as the content itself begins playback. Motion data may be indicative of an amount of motion that occurs between a frame and one or more preceding frames, where an increase in motion may be indicative of a higher probability that the frame is the first content frame.

Intensity and/or motion values for frames may be determined by an intensity/motion processing engine 470. For example, the intensity/motion processing engine 470 may be configured to analyze one or more frames to determine one or more intensity values and/or one or more motion values for a frame. The video data 430 may be input at the intensity/motion processing engine 470 for determination of one or both the intensity and/or motion values.

To determine a motion value for the frame, the intensity/motion processing engine 470 may determine differences in pixel values for respective pixels between a frame for which intensity and/or motion values are being determined, such as a second frame, and one or more preceding frames, such as a first frame. The differences in pixel values may reflect a change in the color and/or brightness of the respective pixels. The intensity/motion processing engine 470 may determine a sorted order (e.g., in descending order, etc.) or a ranking of the respective differences in pixel values. In one disclosed embodiment, the intensity/motion processing engine 470 determines a ninety-fifth percentile value of the respective differences in pixel values using the sorted order. The ninety-fifth percentile value may be used so as to avoid using outlier data, such as a small bright area or a small change in intensity between two consecutive frames. In other embodiments, a different percentile pixel value may be determined, or an average of a set of pixel values may be determined and used to determine a motion value for the frame. The motion value may be the ninety-fifth percentile value of the differences in pixel value. The value of the ninety-fifth percentile can be compared against a threshold to determine if there is motion that occurs between two frames, where the motion is reflected by changes in pixel values.

To determine an intensity value for the frame, the intensity/motion processing engine 470 may determine first light intensity values for pixels associated with a frame. Light intensity values may be greyscale pixel values, such as values between 0 and 255. The intensity/motion processing engine 470 may determine second light intensity values for pixels associated with one or more preceding frames, and may determine differences in respective pixel values between the first light intensity values and the second light intensity values. The intensity/motion processing engine 470 may determine a sorted order of the differences, and may determine a ninety-fifth percentile value using the sorted order. The ninety-fifth percentile value may be determined to be the intensity value for the frame that is compared to a threshold.

When comparing or otherwise analyzing multiple frames, the intensity/motion processing engine 470 may determine individual pixel values associated with the respective frames. If the frames are identical, the absolute value of a difference between pixel values would be an array of zero values, whereas if the frames are completely different, then the difference between pixel values would be an array of positive integers. In an example, if a first frame and a second frame are three-by-three images, the first frame may have the following pixel values: [1 1 1, 1 1 1, 1 1 1], and the second frame may have the following pixel values: [1 3 2, 5 4 6, 7 8 9]. An absolute value of the difference in pixel values between the frames may be determined to be: [0 2 1, 4 3 5, 6 7 8]. The difference array may be flatted into one-dimension: [0, 2, 1, 4, 3, 5, 6, 7, 8], and may be sorted into: [0, 1, 2, 3, 4, 5, 6, 7, 8]. The ninety-fifth percentile of this array may be determined by multiplying the number of elements (9) in the array by the percentile (0.95), which equals 8.55. 8.55 may be rounded up to 9, so the ninety-fifth percentile value of the sorted order may be determined to be the ninth element of the sorted order, or the value "8." Accordingly, the ninety-fifth percentile value of the difference in pixel values between the respective frames in this example may be determined to be 8. In another example, if the frames were 128×128 pixel frames, the ninety-fifth percentile value would be the sorted value at the 15,565th position in the sorted array. If the detected change in intensity or motion at the selected percentile is greater than a threshold, then some embodiments conclude that there is a change in intensity or motion and not just noise.

In some embodiments, the first frame determination engine 450 may use the intensity value and/or the motion value in conjunction with the frame classification data 440 to determine the first frame of the video content. For example, the first frame determination engine 450 may receive or otherwise determine the intensity and/or motion values for respective frames of the video content 430, and may determine respective probability values indicative of the likelihood that a certain frame is the desired "first frame." For example, the first frame determination engine 450 may determine that a certain classification is accurate (e.g., a first frame or content start classification) by determining, using the classification value, the intensity value, and/or the motion value, a probability value indicative of the likelihood that the classification of the frame is accurate, and/or that a certain frame is the first frame.

In some instances, classification values may be associated with baseline probability values indicative of a likelihood that the frame associated with the classification value is the desired first frame of video content. For example, a blank screen state or classification value may be associated with a baseline probability value of 0.1 out of 1.0, movie state or classification values may be associated with a baseline probability value of 0.9, and so forth. Each classification value may be associated with the same or a different baseline probability. Baseline probability values may be adjusted by the first frame determination engine 450 using intensity and/or motion values to determine a probability value that the associated frame is the first frame of video content.

As previously discussed, different streaming services and/or playback devices may have different loading sequences and/or user interfaces. For example, a first streaming service may fade out of a home page and fade in on a movie page at the same time without displaying a movie loading page, whereas a second streaming service may auto-play a movie before a "play" button is selected.

To handle such variations, motion values may be determined, where the first frame determination engine 450 and/or the intensity/motion processing engine 470 may compute the intensity value difference between adjacent frames, and may then optionally apply a three-by-three min filter to suppress noise, after which a ninety-fifth percentile (or any other suitable percentile) value may be determined. In an example, intensity may be determined by generating a two-dimensional matrix of pixel brightness values (e.g., ranging from 0 to 255), flattening the matrix into a one-dimensional array, and then determining the ninety-fifth percentile value. In one example, the following equation may be used to determine motion values:

$$MO_t = PT_{95}(DF_t(x,y)) \forall (x,y) \in ROI)$$

$$DF_t(x,y) = \min_{x4 \in [x-1,x+1], y4 \in [y-1,y+1]} |I_t^{gray}(x_i,y_i) - I_{t-1}^{gray}(x_i,y_i)|$$

A second feature that may be used to account for differences across streaming services and/or platforms may be a regional intensity (IT) where the ninety-fifth percentile value of the intensity value is computed in a pre-defined region of interest for an input frame. This feature may account for instances where a bright "pause" button or playback bar is displayed in high intensity although the remainder of the frame may be dark.

For the video sequence of the video data 430, the first frame determination engine 450 may determine a probability that content has started (PS(t)) sequentially for each frame at time t (ft), using a formula such as:

$$P_S(t) = P_M(SG_t)(1 - CO(SG_{t-1}))H(MO_t - T_{MO}))H(IT_t - T_{IT})$$

where Ps(t) is the probability that a frame is the first frame, $P_m$ is probability function that the frame is from actual content (and may be a predetermined value based on state classification), $SG_t$ is the state value of the frame, $SG_{t-1}$ is the state value of the preceding frame, $MO_t$ is the motion value, $T_{mo}$ is a motion threshold, $IT_t$ is the intensity value, and $T_{it}$ is the intensity threshold.

In some instances, a binary algorithm can be implemented to determine whether a frame is the first frame when PS(t) is higher than a certain threshold. Some embodiments may include two probability thresholds TP (L) and TP (H). If PS(t) has a value between the two thresholds, the frame may be tagged as a potential first frame (PFF) and analysis may continue of subsequent frames. If ft has a probability value PS(t)>TP (H), the algorithm may end processing, and output the first frame. Similarly, when ft has a probability value PS(t)<TP (L), PFF may be cleared and processing may continue on to the next frame.

In the formula, H is the Heaviside (unit) step function, $MO_t$ and $IT_t$ are the motion value and intensity value at time t and $T_{MO}$ and $T_{IT}$ are the thresholds, respectively. The SGt and SGt−1 are the state or classification values of the frame and the preceding frame, respectively, and its associated probability value. Each frame may therefore have an associated probability value (determined using the state or classification), which may be adjusted by a cost function (CO). CO is the cost function and adjusts the probability value associated with a frame based at least in part on the state or classification of the previous frame. The cost function incorporates a previous frame state. Specifically, for the cost function $CO(SG_{t-1})$: when the probability of whether a movie starts at frame t is calculated, in addition to the features in this frame (t), the frame state of the previous frame (t−1) may also be included in the function. For example, if frame (t−1) is in movie loading state, then it may be more likely that movie starts at frame t; however, if frame (t−1) is in app state, then it may be less likely that movie starts at frame t because a movie loading state may follow an app state before playback of the content. In some embodiments, probability values may be determined by the first frame determination engine. For example, a remote server may determine a first probability value indicative of a likelihood the movie state or content start classification for a frame is accurate. The first probability value may be compared to a threshold and it may be determined that the first probability value satisfies the threshold. In some instances, to determine the first probability value, the remote server may determine, using an intensity value and a motion value associated with a frame, the first probability value indicative of the likelihood the frame is the first frame. If the preceding frame state is a content loading state classification value, the probability for the frame being part of the actual content may increase.

In order to qualify as the first frame, a frame may need to have positive motion and intensity values. For example, the motion and intensity values may need to be greater than respective thresholds in order for function elements to be non-zero (e.g., where $H(MO_t - T_{mo})$ represents motion and $H(IT_t - T_{it})$ represents intensity. Some embodiments may not use motion or intensity values.

After determining the first frame of the video content, the first frame determination engine 450 may determine a time to the first frame. The time to the first frame may be determined based at least in part on a number of frames preceding the first frame (e.g., by converting the number of frames into a time value), an amount of video data preceding the first frame, and/or other time data associated with the video data 430. The first frame determination engine 450 may output time to first frame data 480. The time to first frame data 480 may be for specific content on a specific streaming service and/or on a specific playback device, such as a specific streaming platform. Accordingly, the same content may have more than one time to first frame on different streaming services and/or on different playback devices.

Figure 5:
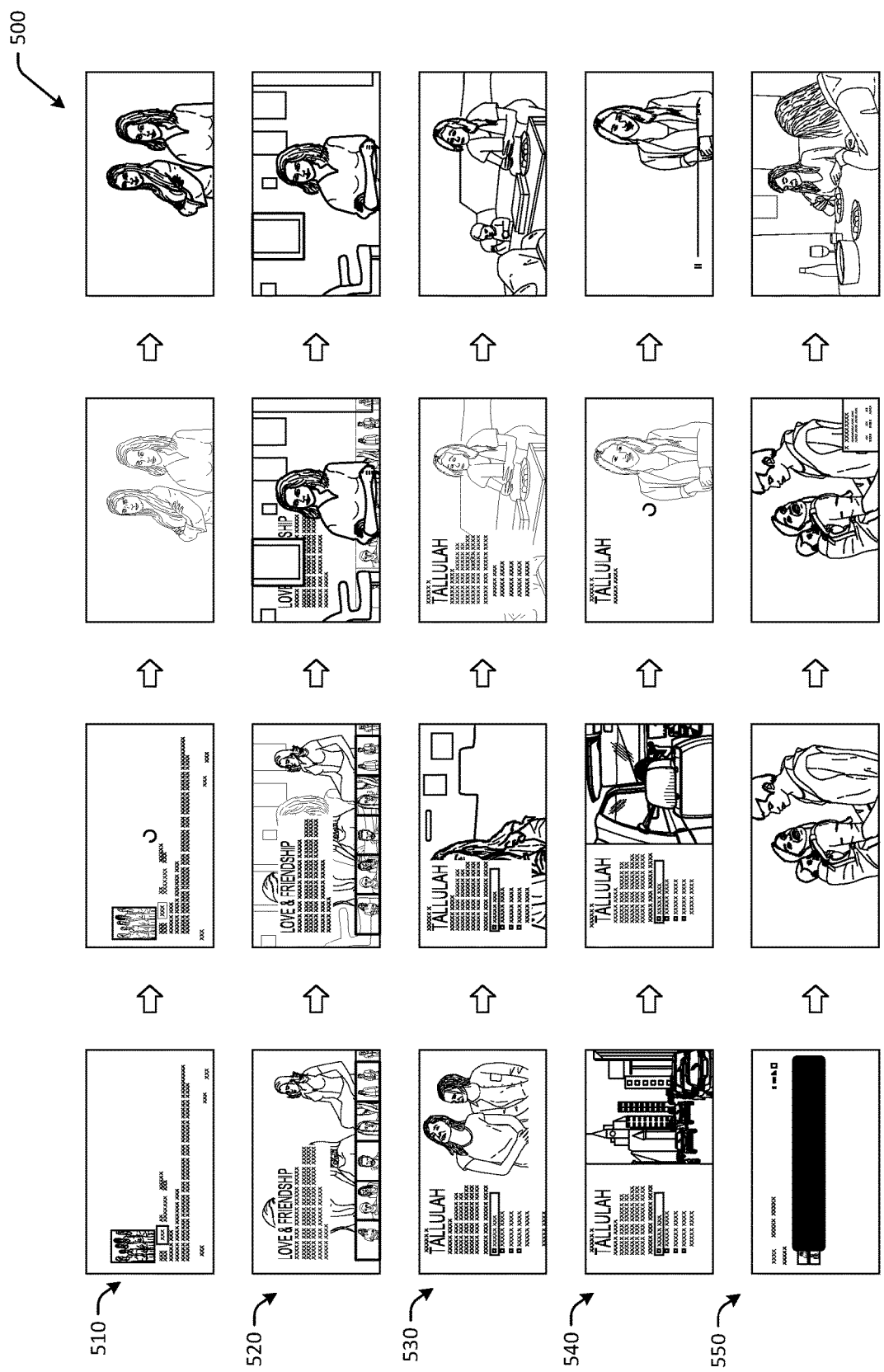
FIG. 5 is a schematic illustration of an example use case for first frame detection in accordance with one or more example embodiments of the disclosure.

FIG. 5 is a schematic illustration of an example use case 500 for first frame detection in accordance with one or more example embodiments of the disclosure. Other embodiments may include additional, fewer, or different user interfaces.

In FIG. 5, various example user interfaces are presented representing different content loading behaviors across different streaming services and/or playback devices. Embodiments of the disclosure may accurately determine a time to first frame regardless of the streaming service and/or playback device used to view content.

At a first row 510, a first frame may be determined to be an application state frame at which a user may launch playback of content at a streaming application. A second frame may be determined to be an application state frame, where the application page is fading out. A third frame may be determined to be a movie state frame, where the movie is fading in. A fourth frame may be determined to be a movie state frame, which may be the first frame of the actual content.

At a second row 520, a first frame may be determined to be an application state frame at which a user may launch playback of content at a streaming application. A second frame may be determined to be an application state frame, where the application page is fading out, and the movie is fading in, unlike in the first row 510. A third frame may be determined to be a movie state frame, where the application page is fading out, and the movie is fading in. A fourth frame may be determined to be a movie state frame, which may be the first frame of the actual content. The fading transitions may be different in the second row 520 relative to the first row 510, but may not affect performance of the time to first frame determination.

At a third row 530, a first frame may be determined to be an application state frame at which a user may launch playback of content at a streaming application. A second frame may be determined to be a movie state frame, which may be a result of an auto-play feature of the streaming service or platform. A third frame may be determined to be a movie state frame, where the text of the application page is fading out. A fourth frame may be determined to be a movie state frame, which may be the first frame of the actual content. The auto-play feature may be different than the features of the second row 520 and the first row 510, but may not affect performance of the time to first frame determination.

At a fourth row 540, a first frame may be determined to be an application state frame at which a user may launch playback of content at a streaming application. However, a trailer for the content may automatically begin playing. A second frame may be determined to be a movie state frame, even though the content is a trailer and not the actual content. A third frame may be determined to be a movie load state frame, where the content is loading. A fourth frame may be determined to be a movie state frame, which may be the first frame of the actual content. Although the trailer may initially be determined to be a movie state frame, the state correction may result in a correction of the state, as the subsequent frame is a loading state.

At a fifth row 550, a first frame may be determined to be an application state frame at which a user may launch playback of content at a streaming application. A second frame may be determined to be a movie load state frame, where the content is loading. A third frame may be determined to be a movie load state frame, where the content continues to load. A fourth frame may be determined to be a movie state frame, which may be the first frame of the actual content. The loading feature may be different than the features of the other rows, but may not affect performance of the time to first frame determination. Other example frames of a first text state and a second text state may be used, where a first text state may be text over a blank background (e.g., credits frame), and the second text state may be text over an image or other non-blank background (e.g., title frame in a trailer).

Regardless of the loading sequence and individual frames presented across different streaming services and/or playback devices, embodiments of the disclosure may accurately and automatically determine a first frame of content, and a corresponding time to first frame for certain streaming services and/or certain playback devices.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
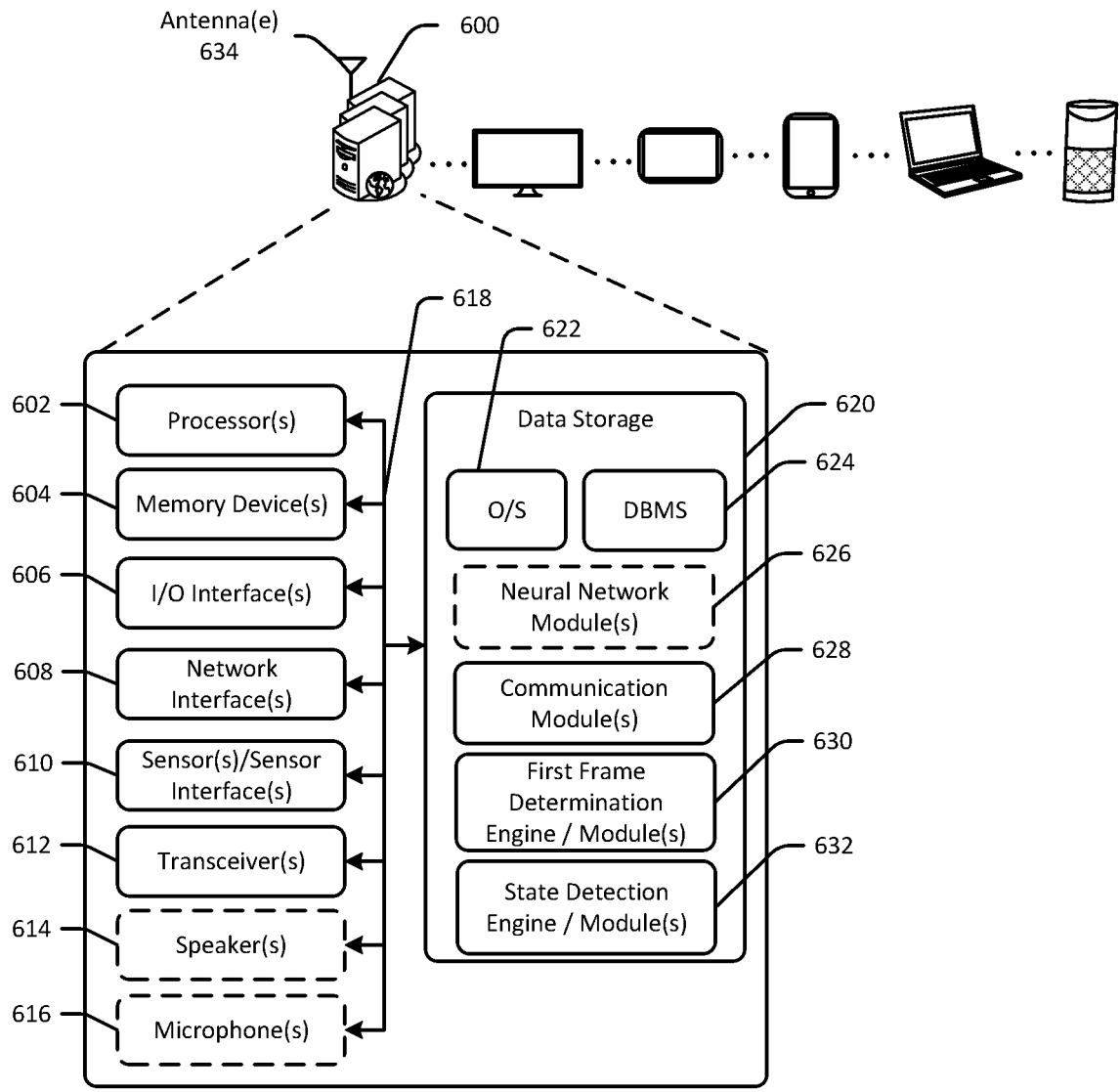
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of first frame determination and/or time to first frame functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s)

602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional neural network module(s) 626, one or more communication module(s) 628, one or more first frame determination engine/module(s) 630, and/or one or more state detection engine/module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, historical time to first frame information, historical accuracy data, and/or other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional neural network module(s) 626 may include computer-executable instructions, code, or the like that responsive to execution by one or more of the processor(s) 602 may perform functions including, but not limited to, determining state classification or classification values for one or more frames, determining probability values, determining elapsed times or durations, determining a number of frames to a first frame, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The first frame determination engine/module(s) 630 may include computer-executable instructions, code, or the like that responsive to execution by one or more of the processor(s) 602 may perform functions including, but not limited to, analyzing digital content, extracting frames, determining aggregated state classifications, determining incorrect state classifications, correcting state classifications, determining first frames, generating notifications, and the like.

The state detection engine/module(s) 632 may include computer-executable instructions, code, or the like that responsive to execution by one or more of the processor(s) 602 may perform functions including, but not limited to, generating notifications, determining states of individual or multiple frames, determining lengths of time associated with sets of frames, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
determining, by one or more computer processors coupled to memory, a first video frame, a second video frame, and a third video frame, wherein the first video frame, second video frame, and third video frame are sequential frames;
determining, using a neural network, a first classification for the first video frame, wherein the first classification is determined from a set of predetermined classifications each of which is associated with a probability that a frame represents a first content frame;
determining, using the neural network, a second classification for the second video frame from the set of predetermined classifications;
determining, using the neural network, a third classification for the third video frame from the set of predetermined classifications;
determining that the second classification is different than both the first classification and the third classification;
replacing the second classification with the first classification;
determining a probability that the third video frame represents a first content frame based in part on its classification;
determining an elapsed time between initiation of video content and the third frame; and
causing the elapsed time to be presented at a user interface.

2. The method of claim 1, further comprising:
determining first light intensity values for pixels associated with the third frame;
determining second light intensity values for pixels associated with the second frame;
determining differences in respective pixel values between the first light intensity values and the second light intensity values;
determining a sorted order of the differences;
determining a ninety-fifth percentile value using the sorted order, wherein the ninety-fifth percentile value is an motion value for the third frame;
wherein determining the probability value indicative of the likelihood that the third classification is the first content frame comprises determining, using the motion value and the third classification.

3. The method of claim 1, further comprising:
determining that a first set of sequential frames having the first classification value has a length that satisfies a first threshold, the first set of sequential frames comprising the first frame; and
determining that a second set of sequential frames having the second classification value has a length that is less than or equal to a second threshold, the second set of sequential frames following the first set of sequential frames and comprising the second frame.

4. The method of claim 1, wherein the elapsed time is for a first streaming video service, the method further comprising:
determining a second elapsed time between initiation of video content and the third frame at a second video streaming service; and
causing the second elapsed time to be presented.

5. A method for determining a time to first frame for video content, the method comprising:
receiving, by one or more computer processors coupled to memory, a request to determine a time to first frame for video content;
determining a streaming service and a playback device associated with the request;
determining a time at which playback of the content is initiated;
capturing a playback sequence of the video content;
classifying individual frames of the playback sequence, wherein each classification is associated with a probability value indicative of a likelihood the frame is a first frame;
analyzing classifications of the individual frames; and
determining, based at least in part on the analysis of the classifications of the individual frames, the time to first frame for the video content.

6. The method of claim 5, further comprising:
storing the playback sequence at one or more playback devices.

7. The method of claim 5, further comprising:
causing presentation of the time to first frame at a user device; and
initiating a payment transaction for determination of the time to first frame.

8. The method of claim 5, wherein the playback sequence of the video content is captured using a camera.

9. The method of claim 5, further comprising:
determining a group of frames and corresponding classifications; and
identifying incorrectly classified frames in the group of frames.

10. The method of claim 5, further comprising:
determining a group of frames and corresponding classifications;
determining a motion value using at least two frames in the group of frames; and
adjusting the probability values associated with the at least two frames based at least in part on the motion value.

11. The method of claim 10, further comprising:
determining that the motion value is greater than a threshold.

12. The method of claim 10, wherein determining the motion value using at least two frames in the group of frames comprises:
determining differences in pixel values for respective pixels between the at least two frames;
determining a sorted order of the respective differences in pixel values; and determining a ninety-fifth percentile value of the respective differences in pixel values using the sorted order, wherein the motion value is the ninety-fifth percentile value.

13. The method of claim 5, further comprising:
determining an intensity value for an individual frame; and
adjusting the probability value associated with the individual frame based at least in part on the intensity value.

14. The method of claim 13, further comprising:
determining that the intensity value is greater than a threshold.

15. The method of claim 5, further comprising:
cropping the individual frames prior to classification.

16. The method of claim 5, further comprising:
preprocessing the individual frames prior to classification.

17. A device comprising:
memory configured to store computer-executable instructions; and
at least one computer processor configured to access the memory and execute the computer-executable instructions to:
    determine video content comprising a first frame, a second frame, and a third frame, wherein the first frame is an initial frame of the video content;
    determine, using a neural network, a first classification value for the first frame;
    determine, using the neural network, a second classification value for the second frame;
    determine, using the neural network, a third classification value for the third frame, wherein the third classification value is a content start classification; and
    determine a duration of time between the first frame and the third frame.

18. The device of claim 17, wherein the at least one processor is further configured to access the memory and execute the computer-executable instructions to:
send a request to determine a time to first frame; and
present the duration of time.

19. The device of claim 17, wherein the at least one processor is further configured to access the memory and execute the computer-executable instructions to:
determine that the second classification value is different than the first classification value;
determine that the third classification value is different than the first classification value; and
replace the second classification value with the first classification value.

20. The device of claim 17, wherein the at least one processor is further configured to access the memory and execute the computer-executable instructions to:
determine differences in pixel values for respective pixels between the second frame and the first frame;
determine a sorted order of the respective differences in pixel values; and
determine a ninety-fifth percentile value of the respective differences in pixel values using the sorted order, wherein the motion value is the ninety-fifth percentile value.

* * * * *